US009091336B2

(12) United States Patent
Lin et al.

(10) Patent No.: US 9,091,336 B2
(45) Date of Patent: Jul. 28, 2015

(54) CIRCULATING ELEMENT FOR BALL SCREW AND BALL SCREW USING THE CIRCULATING ELEMENT

(71) Applicant: HIWIN TECHNOLOGIES CORP., Taichung (TW)

(72) Inventors: Ming-Yao Lin, Tainchung (TW); Ming-Che Kuo, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 67 days.

(21) Appl. No.: 13/944,219

(22) Filed: Jul. 17, 2013

(65) Prior Publication Data
US 2014/0182407 A1    Jul. 3, 2014

(30) Foreign Application Priority Data
Dec. 28, 2012    (TW) .............................. 101151250 A (51) Int. Cl.
*F16H 1/24*    (2006.01)
*F16H 55/02*    (2006.01)
*F16H 25/22*    (2006.01)

(52) U.S. Cl.
CPC ............ *F16H 25/2214* (2013.01); *F16H 25/22* (2013.01); *Y10T 74/19767* (2015.01)

(58) Field of Classification Search
CPC ............ F16H 25/2223; F16H 25/2214; F16H 2025/2242
USPC ................ 74/424.81, 424.82, 424.86, 424.87
See application file for complete search history.

(56) References Cited

U.S. PATENT DOCUMENTS

| | | | | | |
|---|---|---|---|---|---|
| 2,519,777 | A | * | 8/1950 | Cochrane | 74/424.87 |
| 3,327,551 | A | * | 6/1967 | Prueter | 74/424.87 |
| 3,942,846 | A | * | 3/1976 | Wilke et al. | 384/43 |
| 4,841,796 | A | * | 6/1989 | Teramachi | 74/424.86 |
| 6,112,610 | A | * | 9/2000 | Welling | 74/424.86 |
| 2002/0003059 | A1 | * | 1/2002 | Yoshioka et al. | 180/444 |
| 2007/0295132 | A1 | * | 12/2007 | Lin et al. | 74/424.86 |

* cited by examiner

*Primary Examiner* — David M Fenstermacher
*Assistant Examiner* — Jake Cook
(74) *Attorney, Agent, or Firm* — Muncy, Geissler, Olds & Lowe, P.C.

(57) ABSTRACT

A circulating element for ball screw includes a first surface defining a circulating passage that extends from one lateral side of the first surface to the other lateral side of the first surface and has a coupling mouth located on each of the two opposite ends thereof, and a second surface defining a coupling groove between the two coupling mouths of the circulating passage and two guide blocks respectively protruding out of the coupling mouths of the circulating passage. Thus, the circulating element has the advantages of low processing cost, ease of installation, high alignment accuracy, and excellent running smoothness.

19 Claims, 14 Drawing Sheets

CIRCULATING ELEMENT FOR BALL SCREW AND BALL SCREW USING THE CIRCULATING ELEMENT

BACKGROUND OF THE INVENTION

1. Field of the Invention

The present invention relates to linear transmission technology and more particularly, to a circulating element for ball screw and a ball screw using the circulating element.

2. Description of the Related Art

Figure 1:
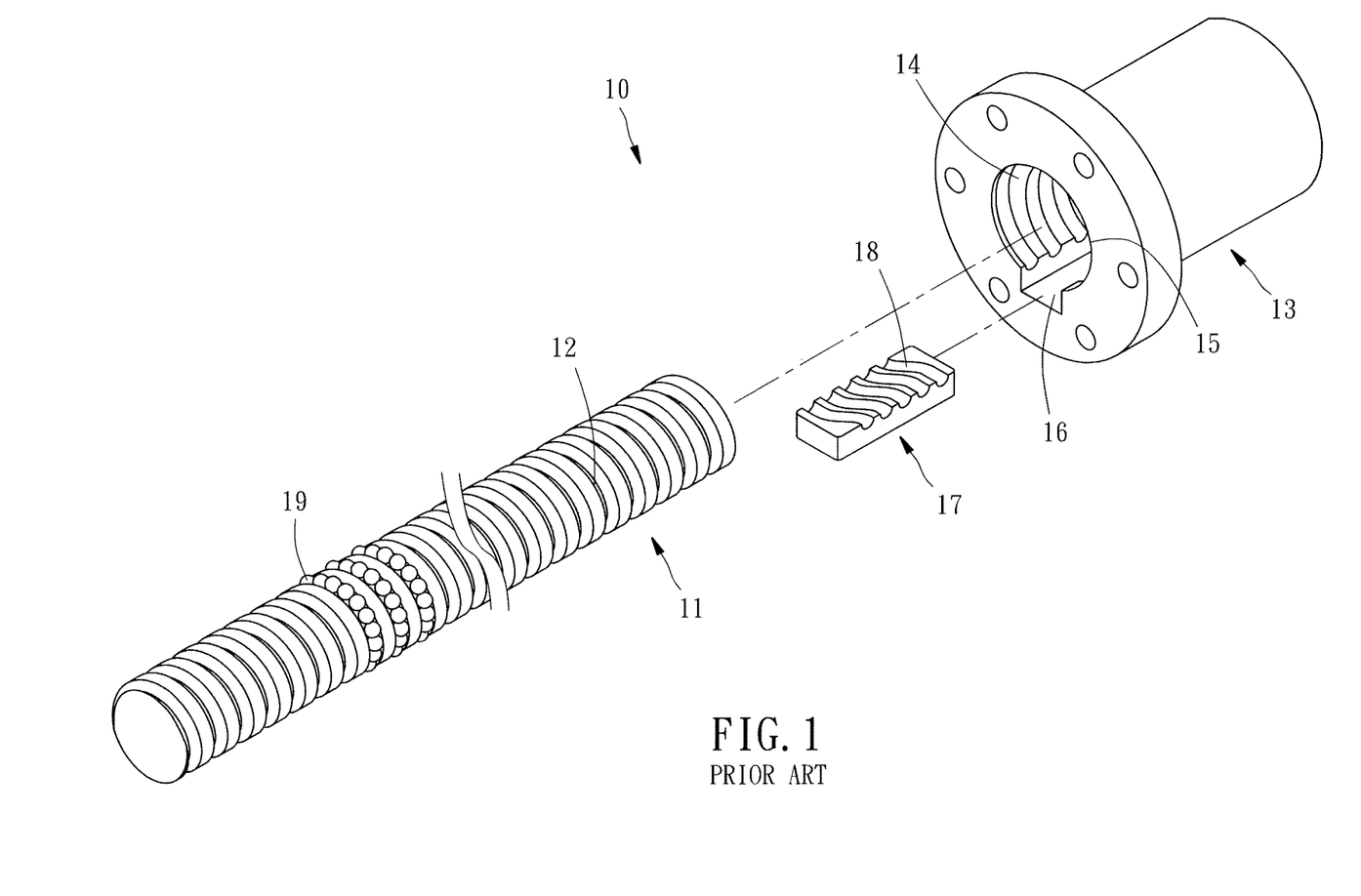
FIG. 1 is an exploded view of a ball screw according to the prior art.

Conventional ball screw designs commonly have a circulating element arranged in the screw nut to provide a circulating passage for enabling balls to circulate between the screw shaft and the screw nut. FIG. 1 illustrates a prior art ball screw 10, which is characterized by the formation of a mounting groove 16 in the hole wall of an axial hole 15 of a screw nut 13 for accommodating a circulating element 17, which defines therein a circulating passage 18 that is connected to an internal thread groove 14 of a screw nut 13, thus, balls 19 can move through a circulating passage that is formed of an external thread groove 12 of a screw shaft 11, an internal thread groove 14 of a screw nut 13 and the circulating passage 18 of the circulating element 17. This type of circulating element 17 can be used only under the condition that the screw nut 13 has an external thread groove located on its one end and linked to the equipment, or the internal thread groove 14 of the screw nut 13 has a short pitch, or the screw nut 13 of the ball screw has a small outer diameter. Due to the structural limitations of the screw nut, the aforesaid prior art circulating element 17 cannot be replaced by a commonly known external circulating or end plug circulating type circulating element.

Figure 2:
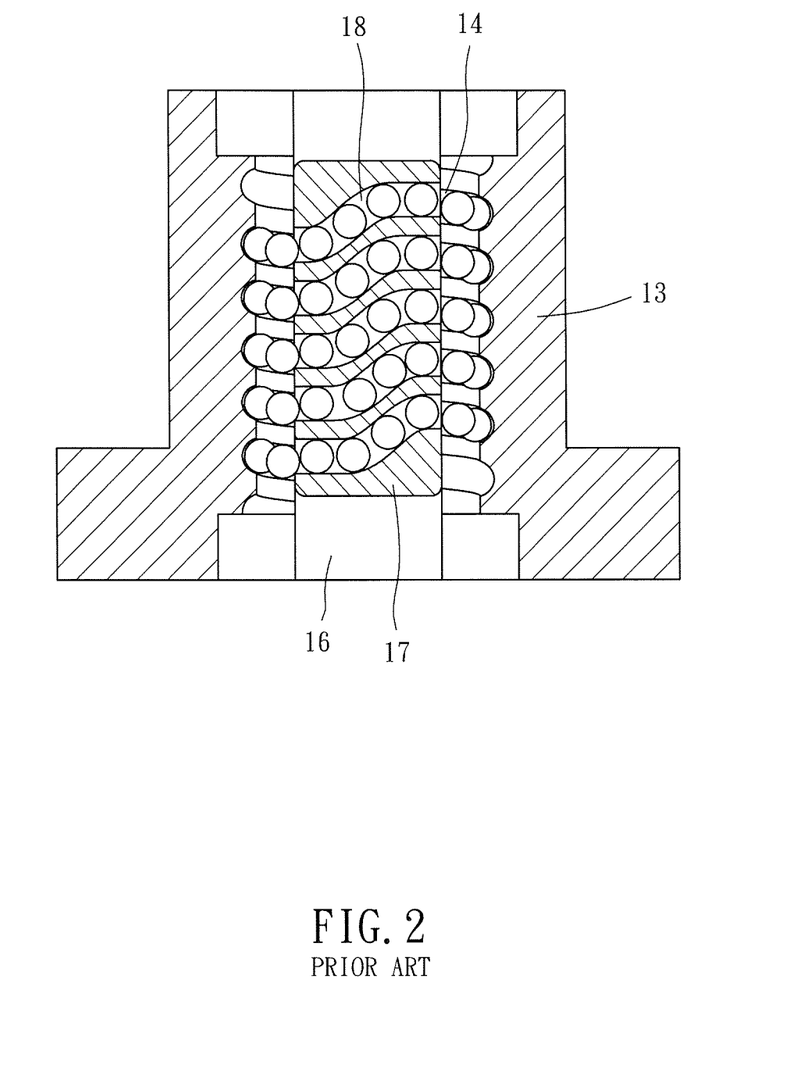
FIG. 2 is a sectional view of a part of the prior art ball screw, illustrating the mounting relationship between the screw nut and the circulating element.

However, in the aforesaid prior art ball screw 10, the mounting groove 16 of the screw nut 13 is made by electrical discharge wire-cutting technology. Except the drawback of high processing cost, the mounting groove 16 will extend through the two opposite ends of the screw nut 13 after the processing. Thus, when mounting the circulating element 17 in the mounting groove 16, it is necessary to constantly adjust the position of the circulating element 17. If position deviation occurs, connection between the circulating passage 18 and the internal thread groove 14 may be unable to achieve, resulting in an alignment problem, as shown in FIG. 2. When an alignment problem occurs, the moving smoothness of the balls 19 will be affected. If the balls 19 do not move smoothly, they will continuously impact the circulating element 17, causing circulating element damage or ball damage.

On the other hand, when loading the balls 19, the balls 19 must be loaded by lots to match the position of the circulating passage 18, i.e., load a first lot of balls 19 in the external thread groove 12, the internal thread groove 14 and the first circulating passage 18 at first, and then load a second lot of balls 19 in the external thread groove 12, the internal thread groove 14 and the second circulating passage 18, and so on, until all of the balls 19 have been loaded in every circulating passage 18. This ball loading procedure is complicated.

In conclusion, the aforesaid prior art technique has the drawbacks of high processing costs, assembly difficulty, low alignment accuracy, and poor running smoothness.

SUMMARY OF THE INVENTION

The present invention has been accomplished under the circumstances in view. It is the main object of the present invention to provide a circulating element for ball screw, which enables the ball screw to have the advantages of low processing costs, ease of assembly, high alignment accuracy, and excellent running smoothness.

To achieve this and other objects of the present invention, a circulating element in accordance with the present invention comprises a first surface, and a second surface opposite to the first surface. The circulating element comprises a circulating passage located on the first surface. The circulating passage extends from one side of the first surface to the other side of the first surface, having a coupling mouth located on each of two opposite ends thereof. The second surface of the circulating element comprises a coupling groove disposed between the two coupling mouths of the circulating passage.

Preferably, the second surface of the circulating element curves inwardly in direction toward the second surface to fit the outer surface of a screw shaft of the ball screw. Further, the first surface of the circulating element defines two inclined planes inclining in reversed directions. One inclined plane of the circulating passage extends along the length of the circulating element to the other inclined plane. Thus, the balls of the ball screw can run in and out of the circulating passage smoothly.

Preferably, the circulating element comprises at least one mounting hole cut through the first surface and the second surface. By means of inserting one respective fastening member through the screw nut of the ball screw and then fastening the fastening member to one respective mounting hole of the circulating element, the circulating element and the screw nut are affixed together.

Other advantages and features of the present invention will be fully understood by reference to the following specification in conjunction with the accompanying drawings, in which like reference signs denote like components of structure.

DETAILED DESCRIPTION OF THE INVENTION

Figure 3:
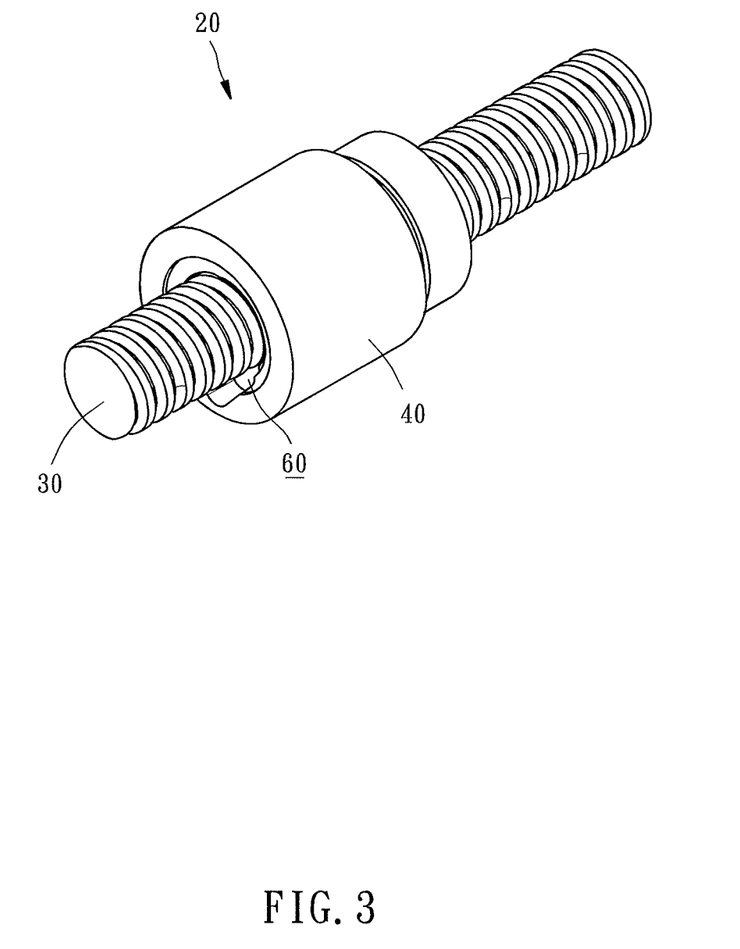
FIG. 3 is an oblique top elevational view of a ball screw in accordance with a first embodiment of the present invention.
Figure 4:
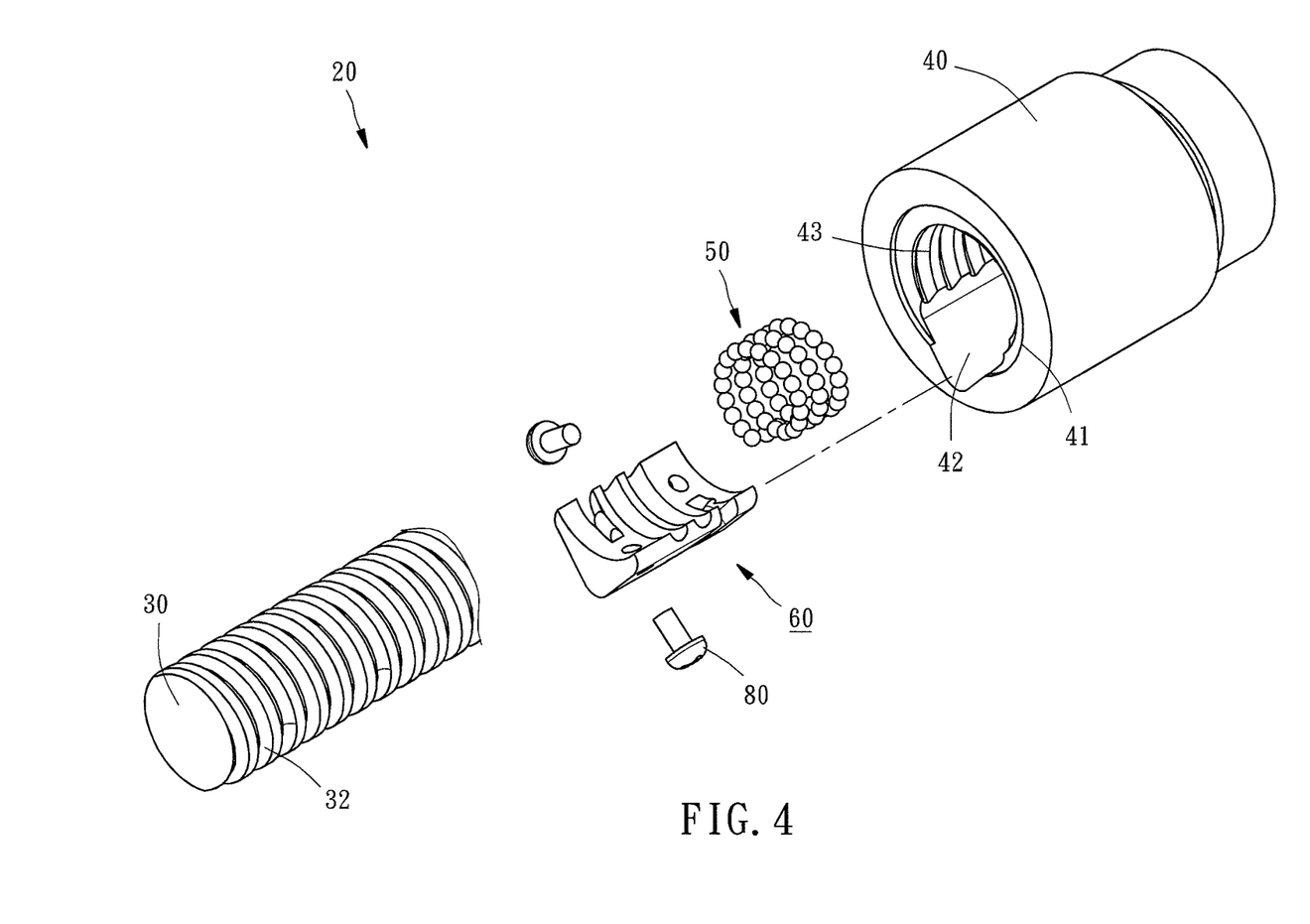
FIG. 4 is an exploded view of the ball screw in accordance with the first embodiment of the present invention.
Figure 5:
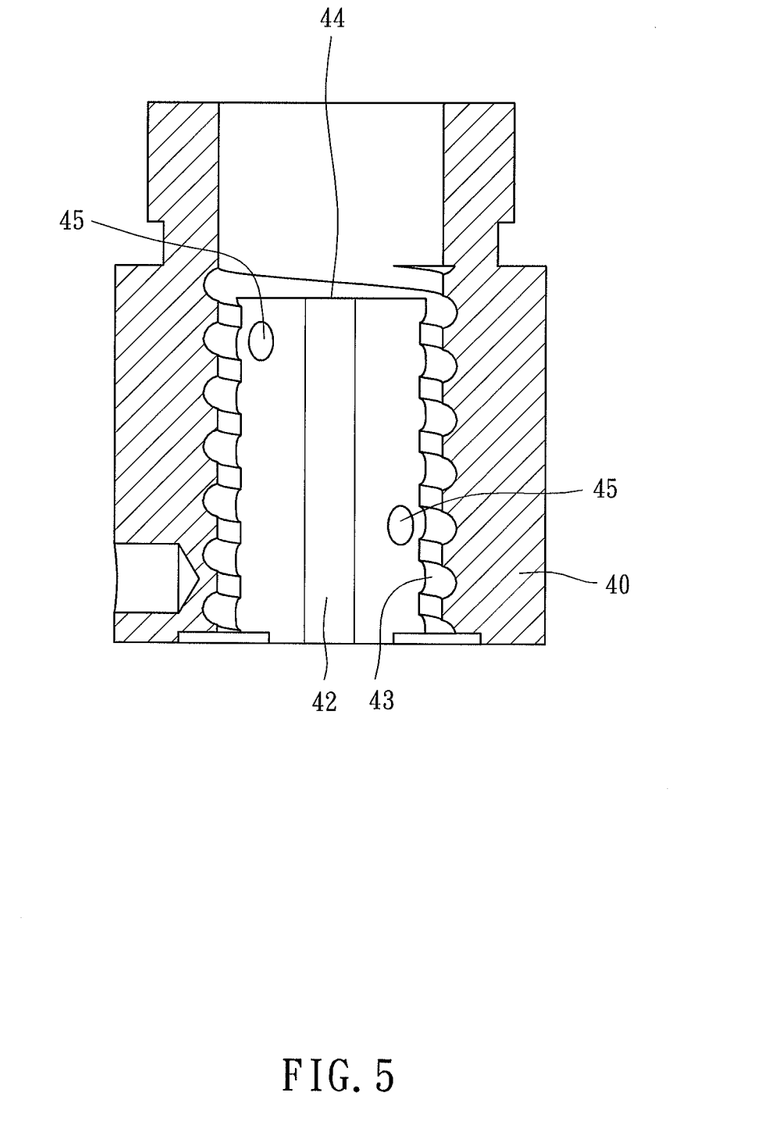
FIG. 5 is a sectional view of the screw nut of the ball screw in accordance with the first embodiment of the present invention.
Figure 11:
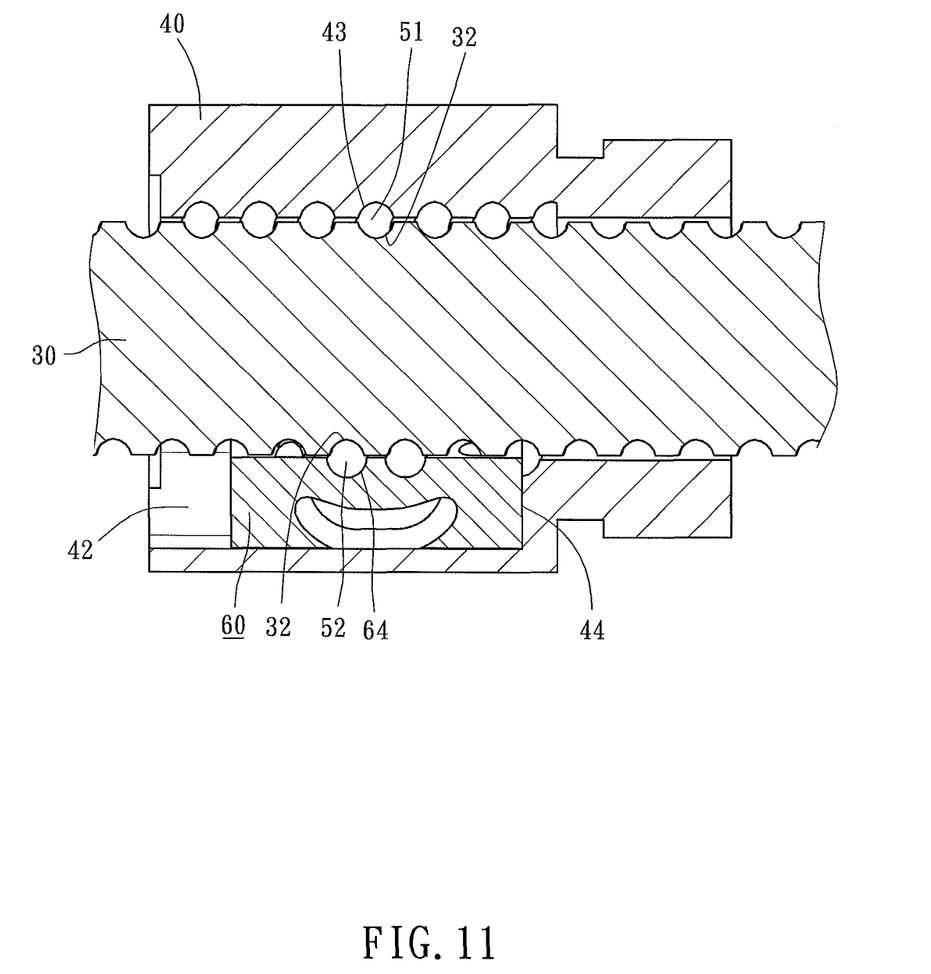
FIG. 11 is a sectional plain view of the ball screw in accordance with the first embodiment of the present invention, illustrating the relationship between the coupling groove of the circulating element and the external thread groove of the screw shaft.
Figure 12:
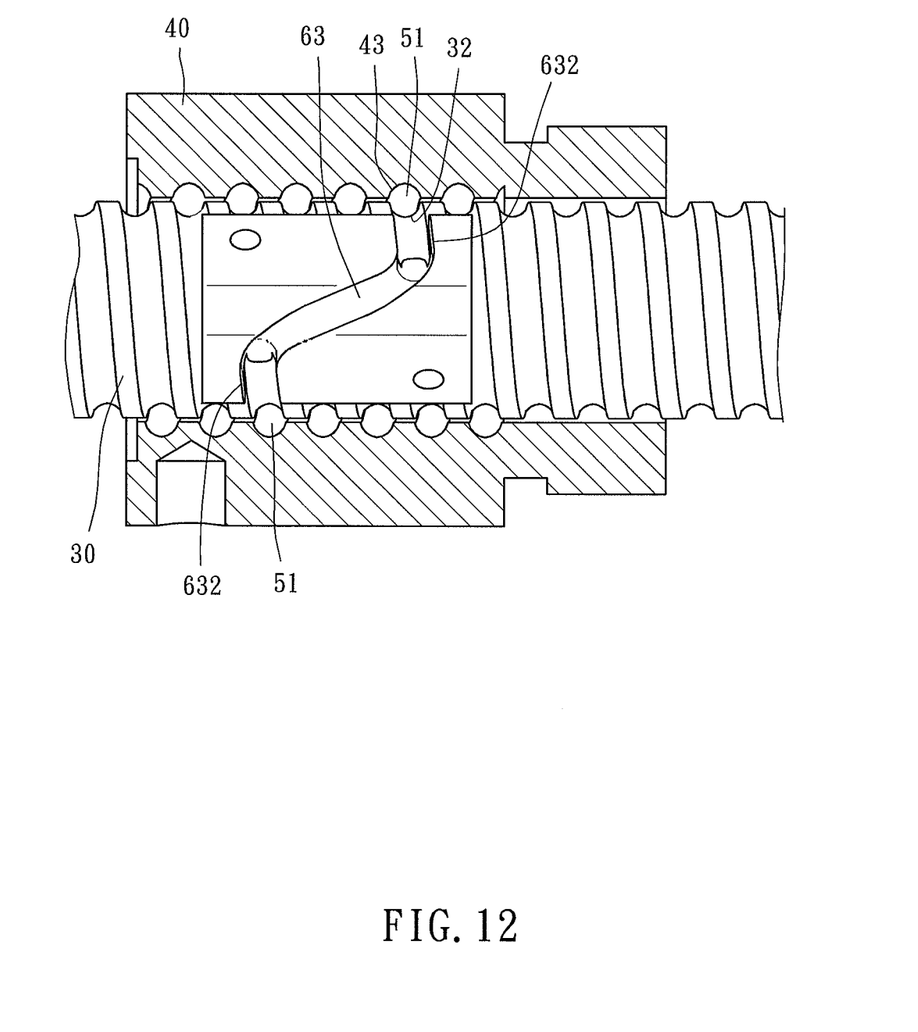
FIG. 12 is a sectional plain view of the ball screw in accordance with the first embodiment of the present invention, illustrating the relationship between the external thread groove of the screw shaft/the internal thread groove of the screw nut and the circulating passage of the circulating element.

Referring to FIGS. 3 and 4, a ball screw 20 using a circulating element 60 in accordance with a first embodiment of the present invention is shown. The ball screw 20 comprises a screw shaft 30, a screw nut 40, and a plurality of balls 50. The screw shaft 30 comprises an external thread groove 32. The screw nut 40 comprises an axial hole 41, which receives the screw shaft 30 for allowing the screw nut 40 to be axially moved along the screw shaft 30, and a mounting groove 42 and an internal thread groove 43 formed in the hole wall of the axial hole 41 and abutted against each other. The mounting groove 42 extends from one end edge of the screw nut 40 axially along the extending direction of the axial hole 41. Further, the mounting groove 42 has one end thereof terminating in a bearing surface 44 (see FIGS. 5 and 11). The internal thread groove 43 corresponds to the external thread groove 32 of the screw shaft 30, defining with the external thread groove 32 a first passage 51 for the running of one ball 50 (see FIGS. 11 and 12). The screw nut 40 further comprises two through holes 45 disposed at two opposite sides relative to the mounting groove 42 (see FIG. 5).

Figure 6:
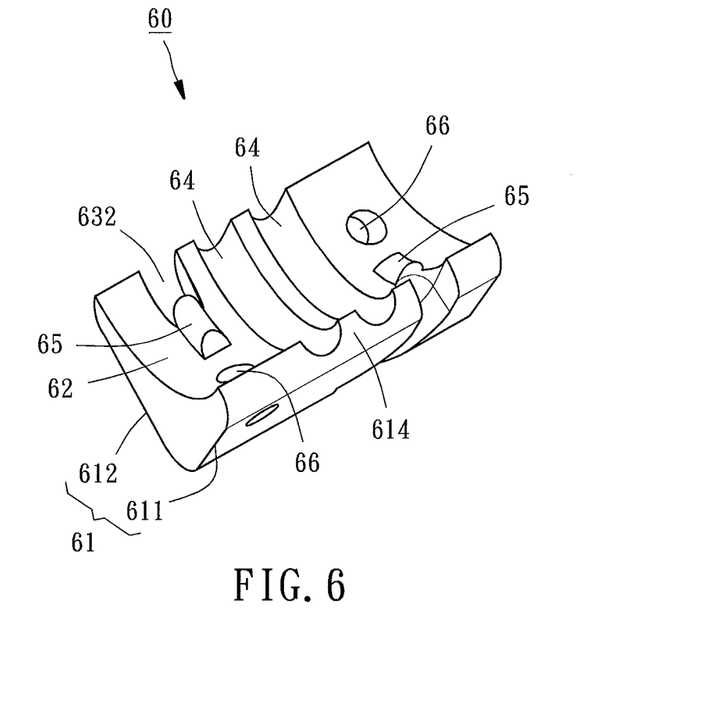
FIG. 6 is an elevational view of a circulating element for ball screw in accordance with the first embodiment of the present invention.
Figure 7:
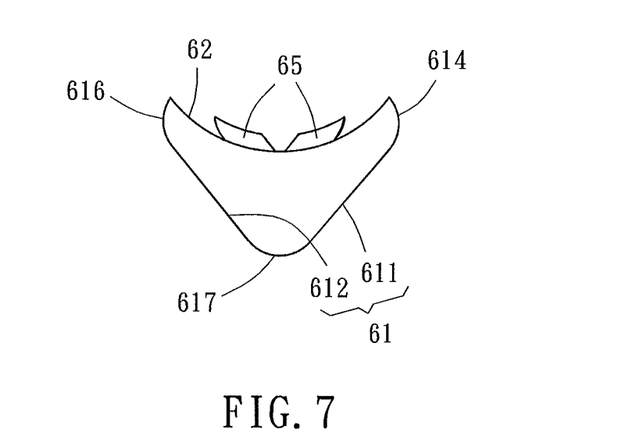
FIG. 7 is an end view of the circulating element for ball screw in accordance with the first embodiment of the present invention.
Figure 8:
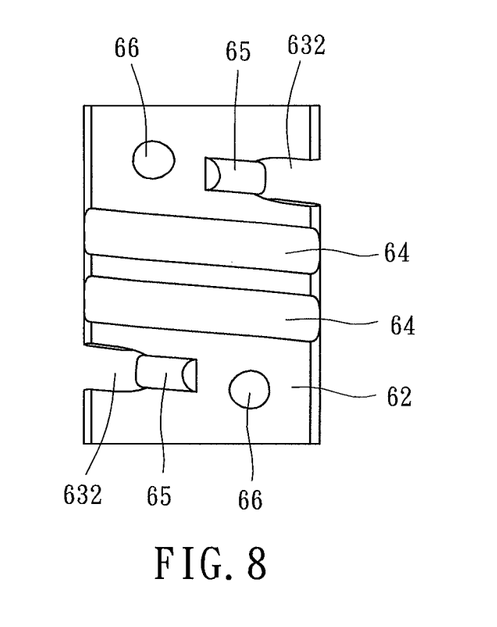
FIG. 8 is a top view of the circulating element for ball screw in accordance with the first embodiment of the present invention.
Figure 9:
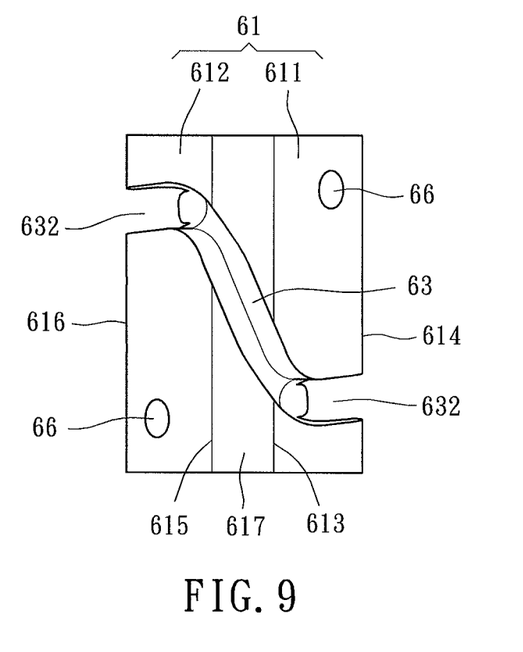
FIG. 9 is a bottom view of the circulating element for ball screw in accordance with the first embodiment of the present invention.

Referring to FIG. 6, the circulating element 60 in accordance with the first embodiment of the present invention has a configuration fitting the mounting groove 42 of the screw nut 40 so that the circulating element 60 can be mounted in the mounting groove 42 of the screw nut 40 and stopped at the bearing surface 44 of the mounting groove 42 after mounting (see FIG. 11), achieving positioning.

As illustrated in FIGS. 6-9, the circulating element 60 comprises a first surface 61, and a second surface 62 opposite to the first surface 61. The second surface 62 curves smoothly inwardly in direction toward the first surface 61 to fit the outer surface of the screw shaft 30. The first surface 61 is divided into opposing first inclined plane 611 and second inclined plane 612. The first inclined plane 611 and the second inclined plane 612 extend in parallel to the tangential direction of the second surface 62, i.e. in parallel to the tangential direction of the screw shaft 30. Further, the first inclined plane 611 defines a first lateral side 613 and a second lateral side 614, and the second inclined plane 612 defines a third lateral side 615 and a fourth lateral side 616, wherein the first lateral side 613 of the first inclined plane 611 and the third lateral side 615 of the second inclined plane 612 are connected together by a first curved chamfer 617; the second lateral side 614 of the first inclined plane 611 and the fourth lateral side 616 of the second inclined plane 612 respectively provide a second curved chamfer and connected to the second surface 62.

Referring to FIGS. 9 and 12 again, the first surface 61 defines a circulating passage 63 for the passing of each ball 50. The circulating passage 63 extends from the second lateral side 614 of the first inclined plane 611 of the first surface 61 along the length of the circulating element 60 over the first curved chamfer 617 and then obliquely toward the fourth lateral side 616 of the second inclined plane 612 of the first surface 61, having two opposite open ends thereof respectively terminating in a respective coupling mouth 632. The two coupling mouths 632 at the two opposite ends of the circulating passage 63 respectively cut through the first surface 61 and the second surface 62 and are respectively connected to the first passage 51 so that each ball 50 can move through the circulating passage 63 into or out of the first passage 51.

Figure 10:
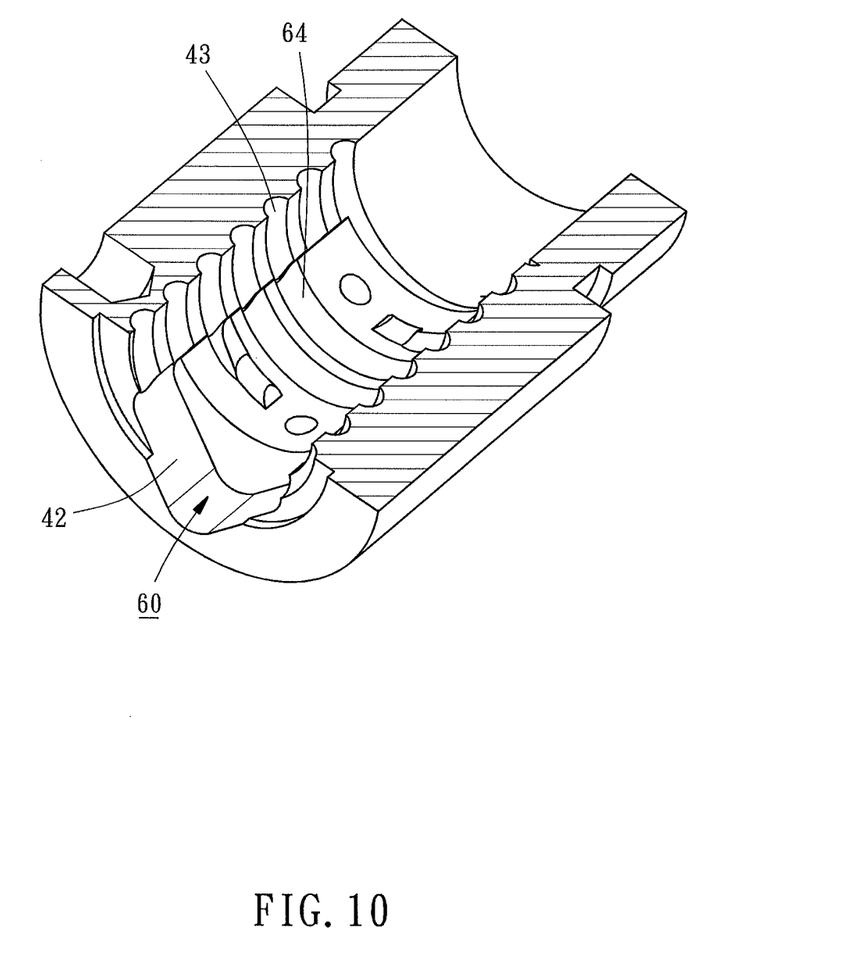
FIG. 10 is a sectional elevation of the ball screw in accordance with the first embodiment of the present invention, illustrating the relationship between the internal thread groove of the screw nut and the coupling groove of the circulating element.
Figure 13:
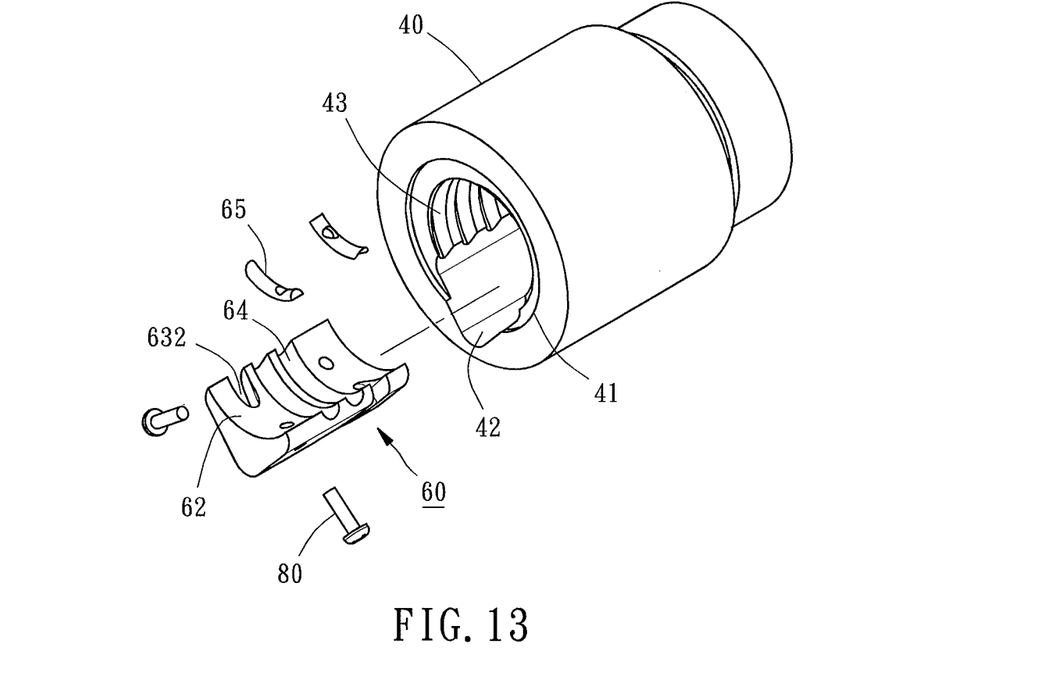
FIG. 13 is an exploded view of the ball screw in accordance with the first embodiment of the present invention.

Referring to FIGS. 8, 10 and 11 again, the second surface 62 defines two opposite coupling grooves 64 and two opposite guide blocks 65. The two coupling grooves 64 are disposed between the two coupling mouths 632 of the circulating passage 63 and adapted to connect the internal thread groove 43 of the screw nut 40 and face toward the external thread groove 32 of the screw shaft 30 such that a second passage 52 is defined between each coupling groove 64 and the external thread groove 32 and connected to the first passage 51 for the passing of each ball 50. The guide blocks 65 are received in the external thread groove 32, each having one end thereof protruding out of the corresponding coupling mouth 632 of the circulating passage 63 for guiding each ball 50 into the first passage 51. It is to be noted that each guide block 65 and the second surface 62 can be integrally made in one piece, or detachably arranged together. In this embodiment, the two guide blocks 65 are formed integral with the second surface 62. In the embodiment shown in FIG. 13, the two guide blocks 65 are respectively detachably joined to the second surface 62. It is to be noted that the use of the guide blocks 65 are not a limitation. Each ball 50 can still run into the first passage 51 without the guide blocks 65. However, the arrangement of the guide blocks 65 enhances running smoothness of the balls 50.

Further, the circulating element 60 comprises two opposite mounting holes 66 respectively cutting through the first surface 61 and the second surface 62 adjacent to the respective guide blocks 65 and in communication with the respective through holes 45 of the screw nut 40. During installation, two fastening members 80 (for example, screws) are respectively inserted through the through holes 45 of the screw nut 40 and fastened to the respective mounting holes 66 of the circulating element 60 to affix the screw nut 40 and the circulating element 60 together. Further, except the mounting method of using the fastening members (screws) 80, tongue and groove mating structure can be used as a substitute, for example, the screw nut 40 can be configured to provide a coupling groove, and the circulating element 60 can be configured to provide a coupling tongue that can be press-fitted into the coupling groove of the circulating element 60.

In conclusion, the circulating element 60 and the ball screw 20 in accordance with the present invention have the following advantages and features:

1. The mounting groove 42 of the screw nut 40 can be formed using a milling or drilling technique; the circulating element 60 can be made using a plastic injection molding or metal forming technique; there is no any particular limitation in this regard. After processing to form the mounting groove 42 on the screw nut 40, the bearing surface 44 is directly formed without cutting through the screw nut 40. Thus, when inserting the circulating element 60 into the mounting groove 42 during installation, the circulating element 60 can be stopped at the bearing surface 44 to achieve positioning without any further adjustment of the position of the circulating element 60. When compared to conventional techniques, the design of the present invention effectively reduces the processing costs, simplifies the installation procedure, and eliminates the problem of alignment between the circulating passage 63 and coupling groove 64 of the circulating element 60 and the internal thread groove 43 of the screw nut 40. In other words, the invention has the advantages of low processing costs, ease of installation and high alignment accuracy.

2. Every ball 50 runs in a circulating path formed of the first passage 51, the two second passages 52 and the circulating passage 63, wherein the entrance region and exit region of the circulating passage 63 are kept in parallel to the tangential direction of the screw shaft 30 subject to the inclined plane design of the first surface 61, enabling each ball 50 to run smoothly from the first passage 51 into the circulating passage 63 and also to run smoothly from the circulating passage 63 into the first passage 51, and therefore the invention significantly enhances the running smoothness of the balls. Further, all of the balls 50 can be loaded in one single loading step, eliminating the drawback of the prior art technique to load all of the balls by lots. After all of the balls 50 have been put in the first passage 51, each ball 50 can run along the first passage 51, the second passages 52 and the circulating passage 63 to fill up the whole circulating path, simplifying the ball loading process.

Figure 14:
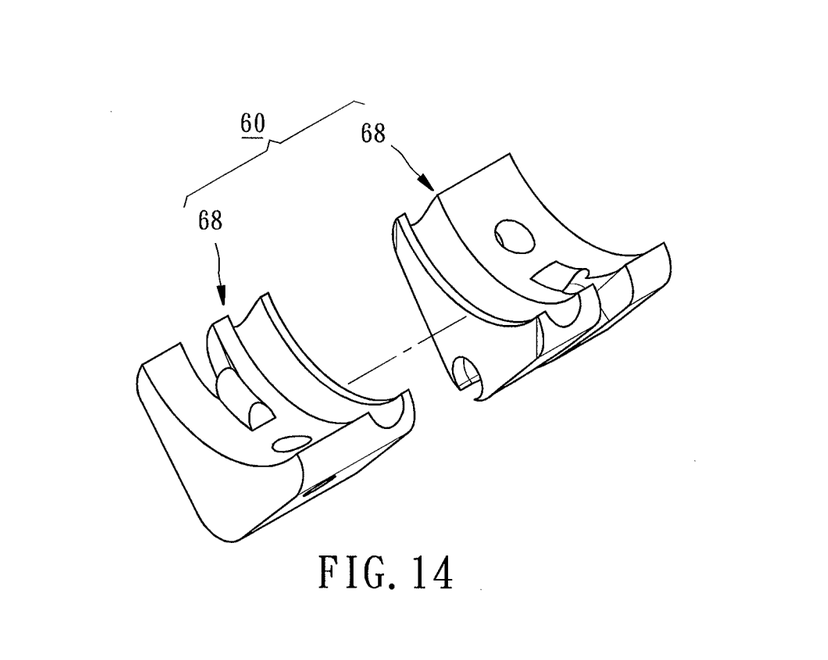
FIG. 14 is an exploded view of the circulating element for ball screw in accordance with the first embodiment of the present invention.
Figure 15:
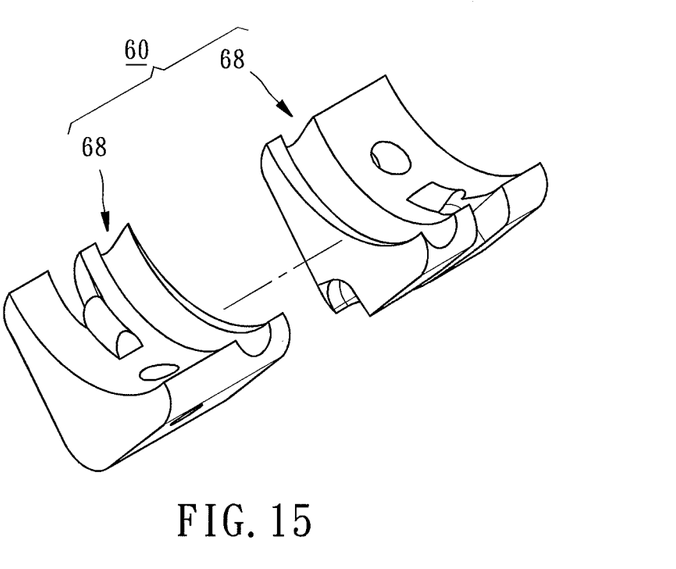
FIG. 15 is an exploded view of the circulating element for ball screw in accordance with the first embodiment of the present invention.
Figure 16:
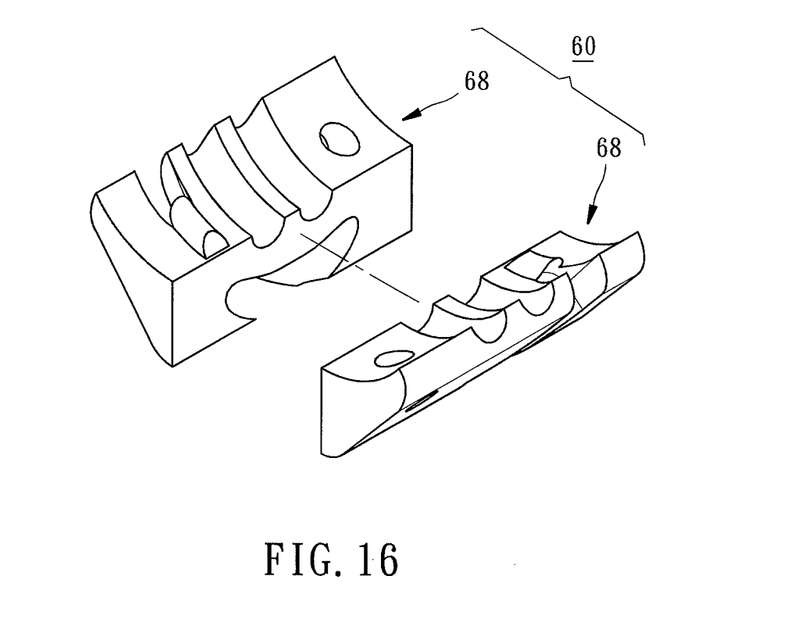
FIG. 16 is an exploded view of an alternate form of the circulating element for ball screw in accordance with the first embodiment of the present invention.
Figure 17:
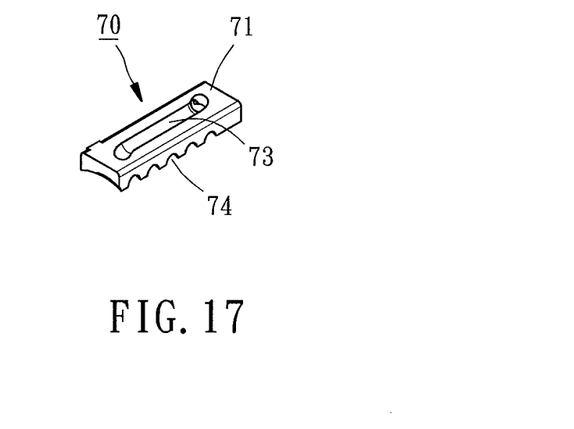
FIG. 17 is an elevational view of a circulating element for ball screw in accordance with a second embodiment of the present invention.
Figure 18:
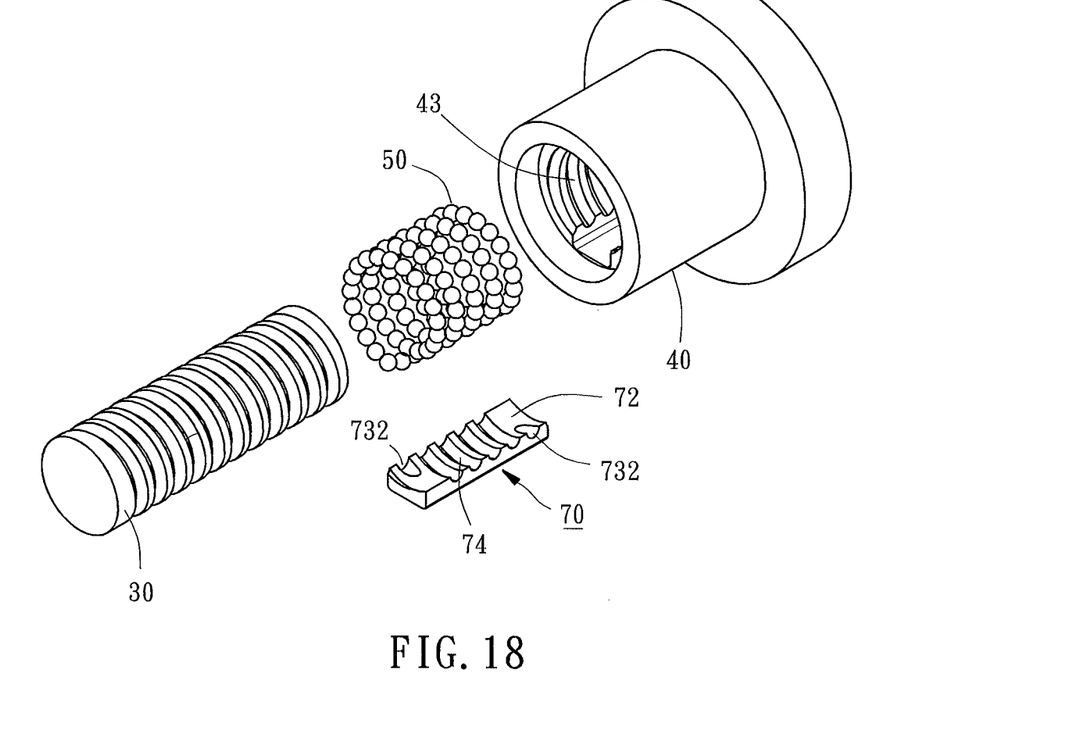
FIG. 18 is an elevational view of a ball screw in accordance with the second embodiment of the present invention.
Figure 19:
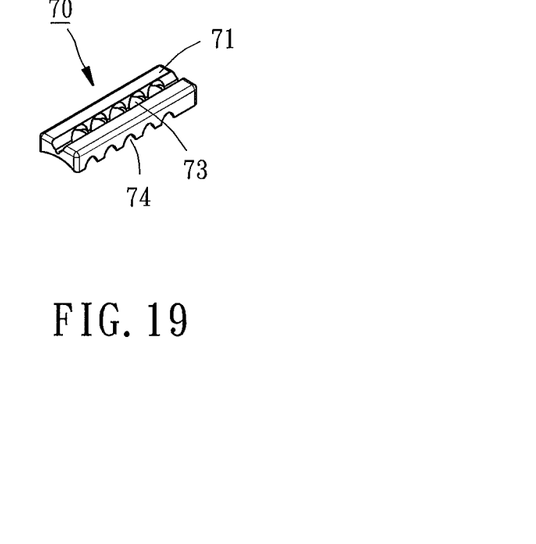
FIG. 19 is another elevational view of the circulating element for ball screw in accordance with a second embodiment of the present invention.
Figure 20:
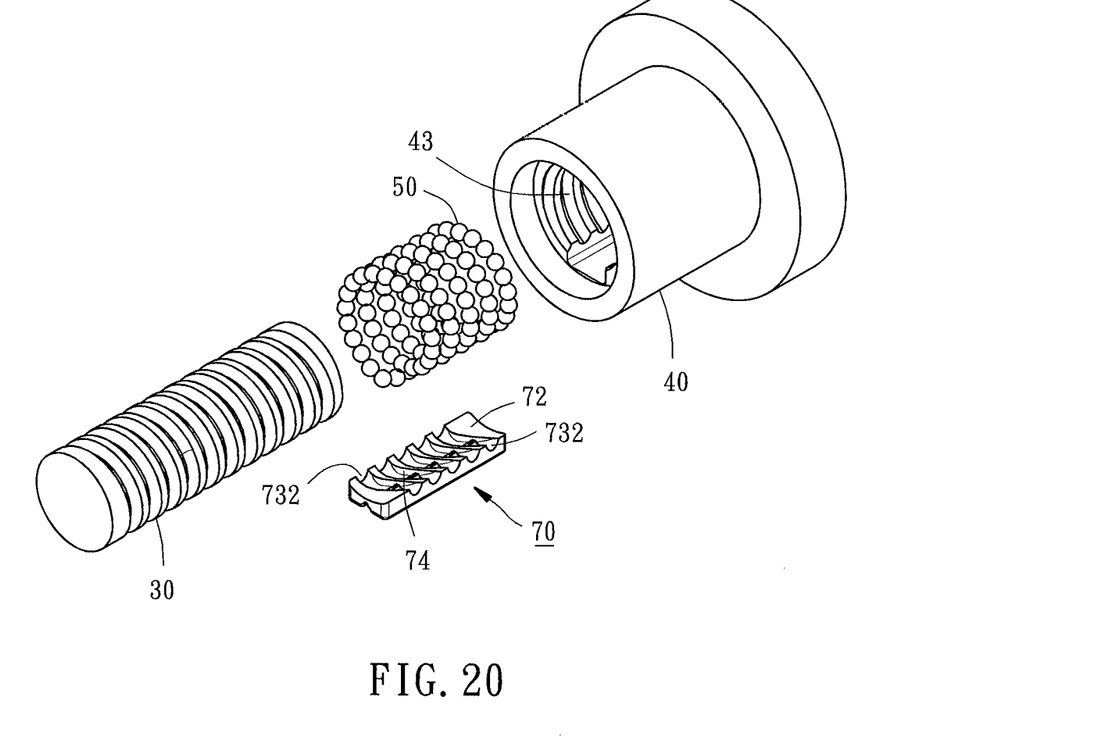
FIG. 20 is another exploded view of the ball screw in accordance with the second embodiment of the present invention.

3. The use of one single circulating element 60 is not a limitation. Alternatively, two circulating elements 60 can be abutted against each other to fit the dimension of the screw nut 40. Further, the circulating element 60 can be a one-piece member. Alternatively, the circulating element 60 can be formed of two sub-bodies 68 longitudinally connected in line, as shown in FIGS. 14 and 15, or transversely connected in a parallel manner, as shown in FIG. 16. When the two sub-bodies 68 are connected together in either of the aforesaid two connection methods, the circulating element 60 achieves the same effects as the one-piece design.

Further, as shown in FIGS. 17-20, a circulating element 70 in accordance with a second embodiment of the present invention comprises a first surface 71, and a second surface 72 opposite to the first surface 71. The second surface 72 curves inwardly in direction toward the first surface 71 to fit the outer surface of the screw shaft 30. The first surface 71 defines a circulating passage 73 for the passing of the balls 50. The circulating passage 73 extends from one lateral side of the first surface 71 along the length of the circulating element 70 to the other lateral side of the first surface 71, having two opposite open ends thereof respectively terminating in a respective coupling mouth 732 that cut through the respective lateral side of the circulating element 70 for connection with the first passage 51. Thus, every ball 50 can run into and out of the first passage 51 through the circulating passage 73. The second surface 72 defines four coupling grooves 74. Each coupling groove 74 is disposed between the two coupling mouths 732 of the circulating passage 73 and adapted to connect the internal thread groove 43 of the screw nut 40, and also arranged to face toward the external thread groove 32 of the screw shaft 30. Thus, every ball 50 can run from each coupling mouth 732 along the circulating passage 73 into the circulating element 70, and then guided by the circulating passage 73 to return to the first passage 51 subject to the guide of.

Thus, during the ball loading operation, the structural design of the circulating passage 73 allows all of the balls 50 to be loaded in one step, eliminating the drawback of the prior art techniques to load all of the balls by lots and simplifying the ball loading process.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A circulating element used in a ball screw having a screw shaft, said circulating element comprising:
   a first surface and a second surface opposite to said first surface, said first surface comprising a circulating passage, said circulating passage extending through said first surface, and
   two coupling mouths arranged respectively at two opposite ends of said circulating passage, said second surface comprising a coupling groove disposed between the two coupling mouths of said circulating passage;
   wherein said first surface defines a first inclined plane and a second inclined plane, said first inclined plane and said second inclined plane inclining in reversed directions; and
   wherein the first inclined plane and the second inclined plane extend in parallel to a tangential direction of the screw shaft.

2. The circulating element as claimed in claim 1, further comprising two guide blocks respectively protruding out of said two coupling mouths of said circulating passage.

3. The circulating element as claimed in claim 1, wherein said second surface curves in a direction toward said first surface.

4. The circulating element as claimed in claim 3, wherein said first inclined plane comprising a first lateral side and a second lateral side, said second inclined plane comprising a third lateral side and a fourth lateral side, said first lateral side of said first inclined plane and said third lateral side of said second inclined plane being connected together, said second lateral side of said first inclined plane and said fourth lateral side of said second inclined plane being respectively connected to said second surface; said circulating passage extends from said second lateral side of said first inclined plane along the length of the circulating element to said fourth lateral side of said second inclined plane.

5. The circulating element as claimed in claim 4, wherein said first surface further comprises a first curved chamfer connected between said first lateral side of said first inclined plane and said third lateral side of said second inclined plane.

6. The circulating element as claimed in claim 4, wherein said second lateral side of said first inclined plane and said fourth lateral side of said second inclined plane respectively provide a respective second curved chamfer.

7. The circulating element as claimed in claim 6, further comprising at least one mounting hole cut through said first surface and said second surface.

8. The circulating element as claimed in claim 1, wherein said circulating passage is an open passage.

9. The circulating element as claimed in claim 8, wherein each said coupling mouth cuts through said first surface and said second surface.

10. A ball screw, comprising:
a screw shaft comprising an external thread groove;
a screw nut comprising an axial hole for receiving said screw shaft, a mounting groove and an internal thread groove located on an inside wall of said axial hole and abutted against each other, said internal thread groove fitting said external thread groove of said screw shaft, said internal thread groove and said external thread groove defining a first passage therebetween; and
a circulating element configured subject to the configuration of said mounting groove of said screw nut and mounted in said mounting groove of said screw nut, said circulating element comprising a first surface and a second surface opposite to said first surface, said first surface comprising a circulating passage, said circulating passage extending through said first surface, said circulating element having two coupling mouths respectively at two opposite ends of said circulating passage, said second surface comprising a coupling groove disposed between the two coupling mouths of said circulating passage, the two coupling mouths of said circulating passage being respectively connected to said first passage, said coupling groove having two opposite ends thereof respectively connected to said internal thread groove, said coupling groove facing toward said external thread groove and defining with said external thread groove a second passage therebetween, said second passage having two opposite ends thereof respectively connected to said first passage; wherein said first surface defines a first inclined plane and a second inclined plane, said first inclined plane and said second inclined plane inclining in reversed directions;
wherein the first inclined plane and the second inclined plane extend in parallel to a tangential direction of the screw shaft; and
a plurality of balls rotatably accommodated in said first passage, said second passage and said circulating passage.

11. The ball screw as claimed in claim 10, further comprising two guide blocks respectively protruding out of said two coupling mouths of said circulating passage of said circulating element, each said guide block being received in said external thread groove.

12. The ball screw as claimed in claim 10, wherein said mounting groove extends from an end edge of said screw nut axially along said axial hole, having one end thereof terminating in a bearing surface for supporting one end of said circulating element.

13. The ball screw as claimed in claim 10, wherein said second surface of said circulating element curves in a direction toward said first surface and fitting the outer surface of said screw shaft.

14. The ball screw as claimed in claim 13, wherein said first inclined plane comprising a first lateral side and a second lateral side, said second inclined plane comprising a third lateral side and a fourth lateral side, said first lateral side of said first inclined plane and said third lateral side of said second inclined plane being connected together, said second lateral side of said first inclined plane and said fourth lateral side of said second inclined plane being respectively connected to said second surface; said circulating passage extends from said second lateral side of said first inclined plane along the length of the circulating element to said fourth lateral side of said second inclined plane.

15. The ball screw as claimed in claim 14, wherein said first surface further comprises a first curved chamfer connected between said first lateral side of said first inclined plane and said third lateral side of said second inclined plane.

16. The circulating element as claimed in claim 15, wherein said second lateral side of said first inclined plane and said fourth lateral side of said second inclined plane respectively provide a second curved chamfer connected to said second surface.

17. The circulating element as claimed in claim 16, wherein said screw nut comprises at least one through hole; said circulating element comprises at least one mounting hole cut through said first surface and said second surface and kept in communication with said at least one through hole of said screw nut and respectively fixedly connected to said at least one through hole of said screw nut by one respective fastening member.

18. The circulating element as claimed in claim 10, wherein said circulating passage is an open passage.

19. The circulating element as claimed in claim 18, wherein each said coupling mouth cuts through said first surface and said second surface.

* * * * *